(12) United States Patent
Bagwan et al.

(10) Patent No.: US 12,041,875 B2
(45) Date of Patent: Jul. 23, 2024

(54) FLEXIBLE MOWER DECK

(71) Applicant: DEERE & COMPANY, Moline, IL (US)

(72) Inventors: Rajesaheb Bagwan, Pune (IN); Chad C. Steen, Holly Springs, NC (US); Michael T. Schmidt, Holly Springs, NC (US); Julian Bellalbero, Raleigh, NC (US); Eric R. Funk, Apex, NC (US)

(73) Assignee: DEERE & COMPANY, Moline, IL (US)

( * ) Notice: Subject to any disclaimer, the term of this patent is extended or adjusted under 35 U.S.C. 154(b) by 749 days.

(21) Appl. No.: 17/248,663

(22) Filed: Feb. 2, 2021

(65) Prior Publication Data

US 2022/0124975 A1 Apr. 28, 2022

(30) Foreign Application Priority Data

Oct. 23, 2020 (IN) .............................. 202021046367

(51) Int. Cl.
| | | |
|---|---|---|
| *A01D 34/66* | (2006.01) | |
| *A01D 34/76* | (2006.01) | |
| *A01D 34/78* | (2006.01) | |
| *A01D 34/82* | (2006.01) | |
| *A01D 69/02* | (2006.01) | |
| *A01D 75/30* | (2006.01) | |
| *A01D 101/00* | (2006.01) | |

(52) U.S. Cl.
CPC ........... *A01D 34/76* (2013.01); *A01D 34/661* (2013.01); *A01D 34/78* (2013.01); *A01D 34/82* (2013.01); *A01D 34/828* (2013.01); *A01D 69/02* (2013.01); *A01D 75/306* (2013.01); *A01D 2101/00* (2013.01)

(58) Field of Classification Search
CPC ...... A01D 34/00–34/905; A01D 69/00–69/12; A01D 2101/00
See application file for complete search history.

(56) References Cited

U.S. PATENT DOCUMENTS

| | | |
|---|---|---|
| 3,473,302 A | 10/1969 | Caldwell |
| 3,797,209 A | 3/1974 | Davis |
| 4,497,160 A | 2/1985 | Mullet et al. |
| 4,858,417 A | 8/1989 | Priefert et al. |

(Continued)

FOREIGN PATENT DOCUMENTS

| | | |
|---|---|---|
| CA | 2947317 A1 | 12/2017 |
| JP | 2012044929 A | 3/2012 |
| JP | 2018061477 A | 4/2018 |

OTHER PUBLICATIONS

Great Britain Search Report issued in Patent Application No. 2111478.0, dated Jan. 27, 2022, in 05 pages.

(Continued)

*Primary Examiner* — Adam J Behrens
*Assistant Examiner* — Madeline I Runco

(57) ABSTRACT

A flexible mower deck includes a center deck with a plurality of belt driven pulleys for rotating a plurality of rotary cutting blades under the center deck. A wing deck is pivotably attached to each of the first and second ends. A motor on each wing deck rotates a rotary cutting blade by actuating a switch in an operator station to pivot each wing deck to a mowing position.

17 Claims, 5 Drawing Sheets

(56) References Cited

U.S. PATENT DOCUMENTS

| | | | |
|---|---|---|---|
| 5,177,942 | A | 1/1993 | Hager et al. |
| 5,241,808 | A | 9/1993 | Colistro |
| 5,280,695 | A | 1/1994 | Nunes, Jr. et al. |
| 5,771,669 | A | 6/1998 | Langworthy et al. |
| 6,065,274 | A | 5/2000 | Laskowski et al. |
| 6,308,503 | B1 | 10/2001 | Scag et al. |
| 6,389,786 | B1 | 5/2002 | Bergsten et al. |
| 6,494,026 | B1 | 12/2002 | Schmidt |
| 6,530,198 | B2 | 3/2003 | Bergsten et al. |
| 6,591,593 | B1 | 7/2003 | Brandon et al. |
| 7,089,722 | B2 | 8/2006 | Laskowski |
| 7,313,902 | B1 | 1/2008 | Eavenson, Sr. et al. |
| 7,401,456 | B2 | 7/2008 | Korthals |
| 7,841,157 | B2 | 11/2010 | Latuszek et al. |
| 8,042,322 | B1 | 10/2011 | Wyatt |
| 8,490,374 | B2 | 7/2013 | Latuszek et al. |
| 8,965,630 | B2 | 2/2015 | Wyatt et al. |
| 9,173,346 | B2 | 11/2015 | Koike et al. |
| 10,433,481 | B2 * | 10/2019 | Welsh .................... A01D 34/81 |
| 10,543,743 | B1 | 1/2020 | Keller |
| 11,437,936 | B2 * | 9/2022 | Schulenberg ............. H02P 4/00 |
| 2004/0148917 | A1 | 8/2004 | Eastwood |
| 2007/0119139 | A1 | 5/2007 | Hofmann et al. |
| 2010/0005769 | A1 | 1/2010 | Landry |
| 2017/0006777 | A1 | 1/2017 | Schucker |
| 2018/0014460 | A1 | 1/2018 | Mullet et al. |
| 2018/0192580 | A1 * | 7/2018 | Zeiler ................... A01D 34/78 |
| 2019/0254228 | A1 | 8/2019 | Tate et al. |
| 2019/0291779 | A1 * | 9/2019 | Zeiler ..................... B60K 1/02 |
| 2021/0059116 | A1 * | 3/2021 | Laurin ................ A01D 34/661 |
| 2021/0100165 | A1 | 4/2021 | Decker et al. |

OTHER PUBLICATIONS

Great Britain Search Report issued in European Patent Application No. GB2215112.0, dated Apr. 5, 2023, in 04 pages.
Hustler, Super104 Operators manual, p. 1-52.
Lastec, WZ400 Gas series 3873C Owner's Manual, p. 1-70.
Lastec, WZ600 series D3780 Owner's Manual, p. 1-76.
Lastec, WZ800 series D3700 Owner's Manual, p. 1-75.
Z Master, Professional 7500-D Series Riding Mower Operators manual, p. 1-72.
Lastec, WZ600 Commercial Zero Turn Mower, p. 1-5, [retrieved on Sep. 16, 2020]. Retrieved from the Internet: <URL: https://www.lastec.com/wz600-commercial-zero-turn-mower>.
Lastec, WZ800 Commercial Zero Turn Mower, p. 1-8, [retrieved on Sep. 16. 2020]. Retrieved from the Internet: <URL: https://www.lastec.com/wz800-commercial-zero-turn-mower>.
Lastec, WZ1000 Commercial Zero Turn Mower, p. 1-7, [retrieved on Sep. 16, 2020]. Retrieved from the Internet: <URL: https://www.lastec.com/wz1000-commercial-zero-turn-mower>.

* cited by examiner

FLEXIBLE MOWER DECK

FIELD OF THE INVENTION

This invention relates generally to mower decks on zero turning radius mowers, and specifically to a mower deck that is flexible and may be used for different cutting widths.

BACKGROUND OF THE INVENTION

Zero turning radius ("UTR") mowers have at least one independently powered drive wheel on each side of a frame. Hydrostatic transmissions transmit power to each of the left and right drive wheels, either in forward or reverse. The pair of hydrostatic transmissions, or dual hydrostatic transmission, may be driven by an internal combustion engine or other power source. The independent drive wheels allow the ZTR mower to turn on a vertical turning axis. The vertical turning axis may be centrally located between the pair of hydrostatic transmissions. A seated operator may use left and right control levers or other steering controls to control the pair of hydrostatic transmissions. ZTR mowers may be operated at ground speeds as fast as 7 mph-8 mph or more while mowing.

ZTR mowers may have mower decks as wide as 100 inches or more, often with a left wing deck and a right wing deck connected to a center deck. Most of these mower decks use a belt to engage pulleys on spindles to rotate five or more rotary cutting blades under the mower deck. However, the mower decks cannot mow at reduced widths because the belt is disengaged when one or both wing decks are pivoted up to a vertical transport position. Alternatively, some mower decks use five or more hydraulic motors to rotate the cutting blades, but the hydraulic lines may leak fluid. Additionally, the operator must stop each time to adjust the cutting height of each wing deck.

A flexible mower deck for a ZTR mower is needed that can mow at reduced widths when one or both wing decks are pivoted up to a vertical transport position. A flexible mower deck for a ZTR mower is needed that reduces the risk of hydraulic fluid leaks. A flexible mower deck for a ZTR mower is needed that allows height of cut adjustments from the operator seat.

SUMMARY OF THE INVENTION

A flexible mower deck includes a center deck with a plurality of rotary cutting blades rotated by a belt engaging a driven pulley for each blade. A first wing deck and a second wing deck are pivotably attached to a first end and a second end of the center deck. Each wing deck is pivotable between a lowered mowing position and a raised transport position. An electric or hydraulic motor is mounted on each of the wing decks to rotate a rotary cutting blade under each of the wing decks. The belt can rotate the plurality of rotary cutting blades under the center deck while each wing deck is in either the mowing position or the transport position.

DESCRIPTION OF THE PREFERRED EMBODIMENT

Figure 1:
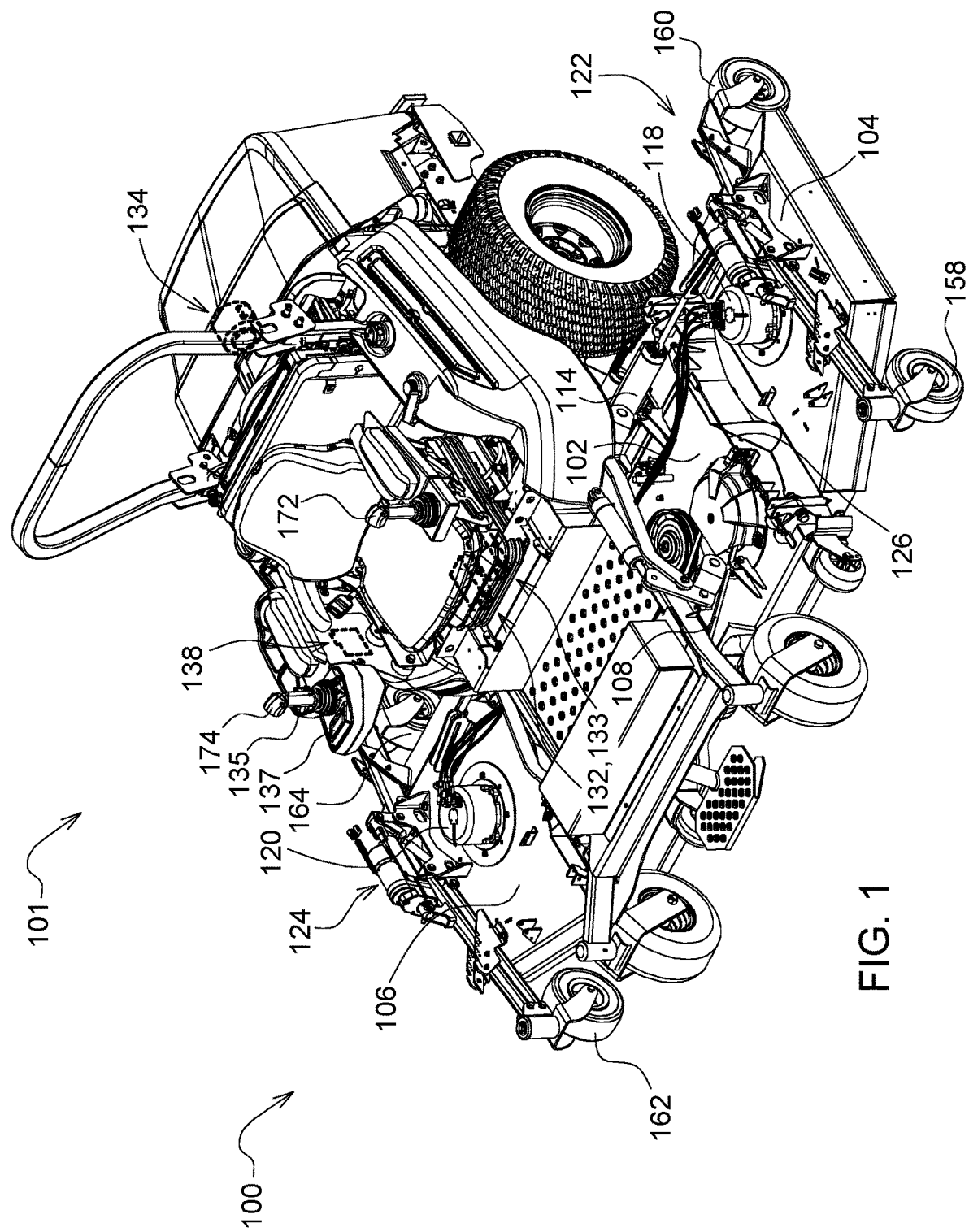
FIG. 1 is a perspective view of a zero turning radius mower with a flexible mower deck according to a first embodiment of the invention.

In one embodiment shown in FIG. 1, flexible mower deck 100 may be on zero turning radius ("ZTR") mower 101 having at least one independently powered drive wheel on each side of a frame. Hydrostatic transmissions may transmit power to each of the left and right drive wheels, either in forward or reverse. The pair of hydrostatic transmissions, or dual hydrostatic transmission, may be driven by an internal combustion engine or other power source. The independent drive wheels allow the ZTR mower to turn on a vertical turning axis centrally located between the pair of hydrostatic transmissions. A seated operator may use left and right control levers 172, 174, joysticks or other similar steering controls to control the pair of hydrostatic transmissions and mow at ground speeds as fast as 7 mph-8 mph or more. The ZTR mower also may include display panel 137 adjacent the steering controls.

Figure 2:
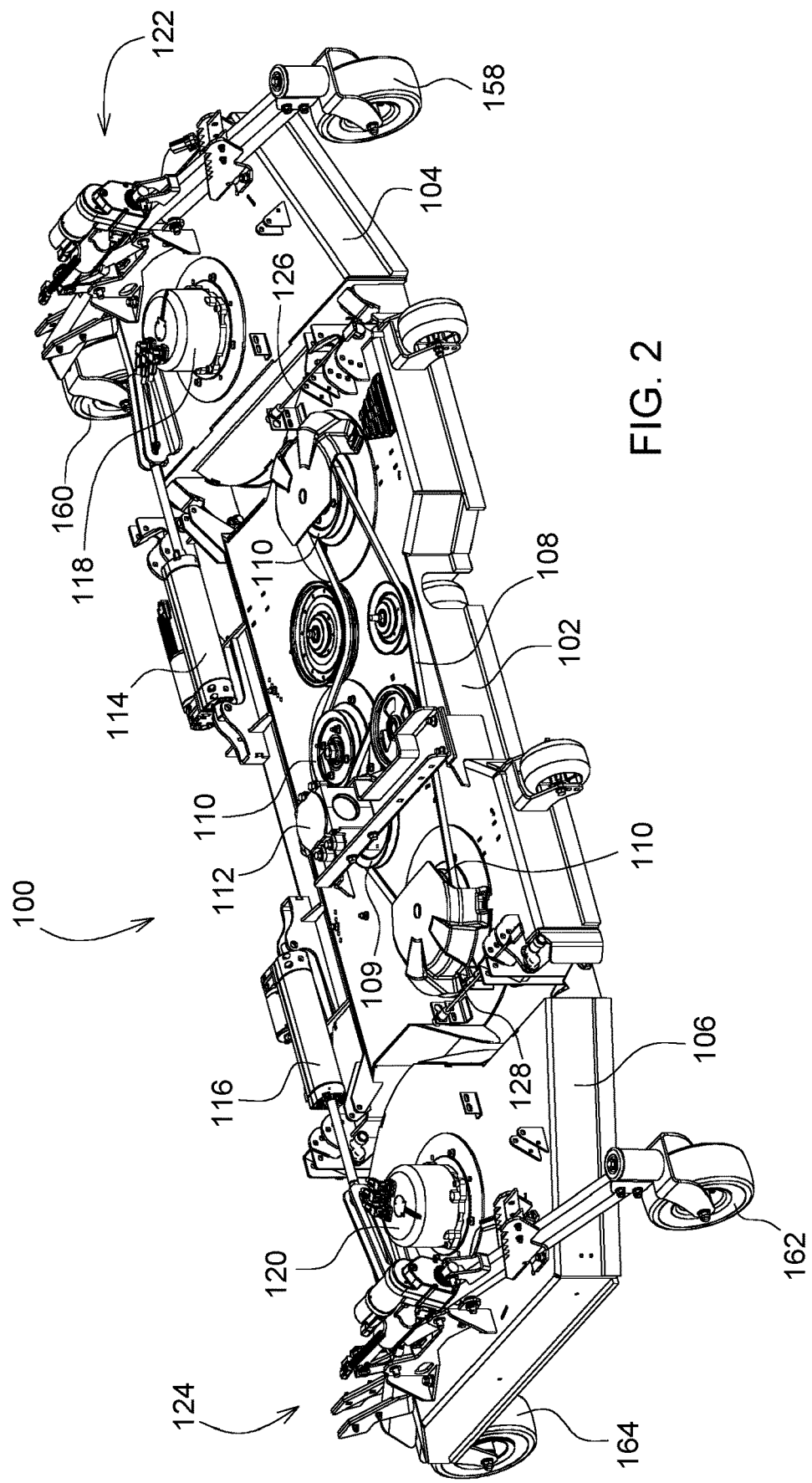
FIG. 2 is a perspective view of a flexible mower deck with both wing decks in the mowing position according to a first embodiment of the invention.
Figure 3:
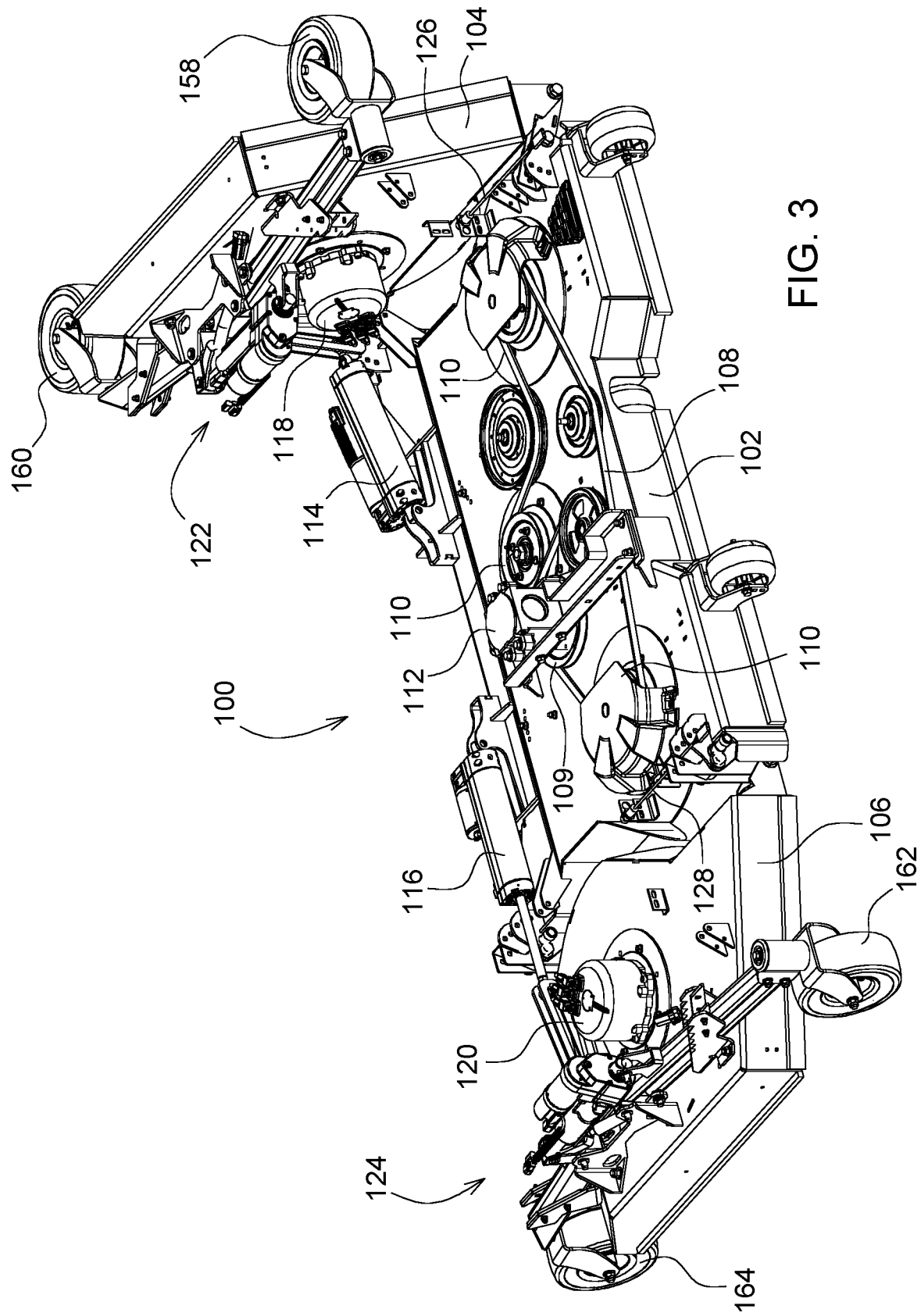
FIG. 3 is a perspective view of a flexible mower deck with one of the wing decks in a transport position according to a first embodiment of the invention.

In one embodiment, as shown in FIGS. 2 and 3, flexible mower deck 100 may include center deck 102 which may cover a plurality of rotary cutting blades mounted on spindles. A driveshaft and gearbox 112 may transmit power from the engine or other power source to drive pulley 109 on the center deck. Alternatively, a belt may be used to transmit power to the drive pulley. The drive pulley may turn drive belt 108 to rotate driven pulleys 110 on blade spindles extending through the center deck.

In one embodiment, as shown in FIGS. 2 and 3, flexible mower deck 100 may include left and right wing decks 104, 106 pivotably mounted to the left and right ends of the center deck. The wing decks may be supported by front caster wheels 158, 162 and rear trailing wheels 160, 164. Each wing deck may have a 4 kW to 8 kW electric motor 118, 120 to rotate one or more rotary cutting blades. For example, the electric blade motors 118, 120 may be electrically connected to inverters 132, 133. The inverters may be electrically connected to alternator 134 that may be belt driven by an internal combustion engine or other power source. Alternatively, a battery pack may provide electric power to the electric blade motors. Controller 138 may set the speed of the electric blade motors on the wing decks based on the sensed rotational speed of the belt driven blades under the center deck. The controller may monitor the speed of the belt driven blades under the center deck. If the controller detects an increase or drop in the speed (due to grass conditions or reduced mowing speed setting, for example), the controller may change the rotational speed of the electric blade motors to match the rotational speed of the belt driven blades. Alternatively, the rotational speed of each of the electric blade motors may be set independently of the other electric blade motor and center deck blades.

In an alternative embodiment, each wing deck may have a hydraulic motor to rotate one or more cutting blades. Each of the hydraulic blade motors may be connected to a valve and a hydraulic pump. The controller may set the speed of the hydraulic motors on the wing decks based on sensed rotational speed of the belt drive blades under the center deck. If the controller detects an increase or drop in speed, the controller may change the rotational speed of the hydraulic blade motors to match the rotational speed of the belt driven blades. Alternatively, the flexible mower deck may have operator controls to set the rotational speed of the hydraulic motors independently of each other and the center deck blades.

In one embodiment, flexible mower deck 100 may be used to mow with the center deck only, the center deck and both wing decks as shown in FIG. 2, or the center deck one wing deck as shown in FIG. 3. Lift/lower switches on each of a pair of operator control levers or joysticks 172, 174 may be used to actuate hydraulic cylinders 114, 116 or electrical actuators to independently pivot each wing deck between a mowing position and a transport position. Alternatively, lift/lower switches for the wing decks may be located in the operator station adjacent display panel 137. Each of the wing decks may be moved between the mowing position and transport position without changing the position or operation of belt 108 on the center deck. Additionally, the flexible mower deck may include position sensors 126, 128 which may provide electronic signals to controller 138 indicating if each wing deck is in the mowing position or transport position. The controller may shut off the electric blade motor if the position sensor indicates the wing deck is not in the mowing position. The deck position sensors may be non-contact metallic sensors for detecting the position of each wing deck.

Figure 4:
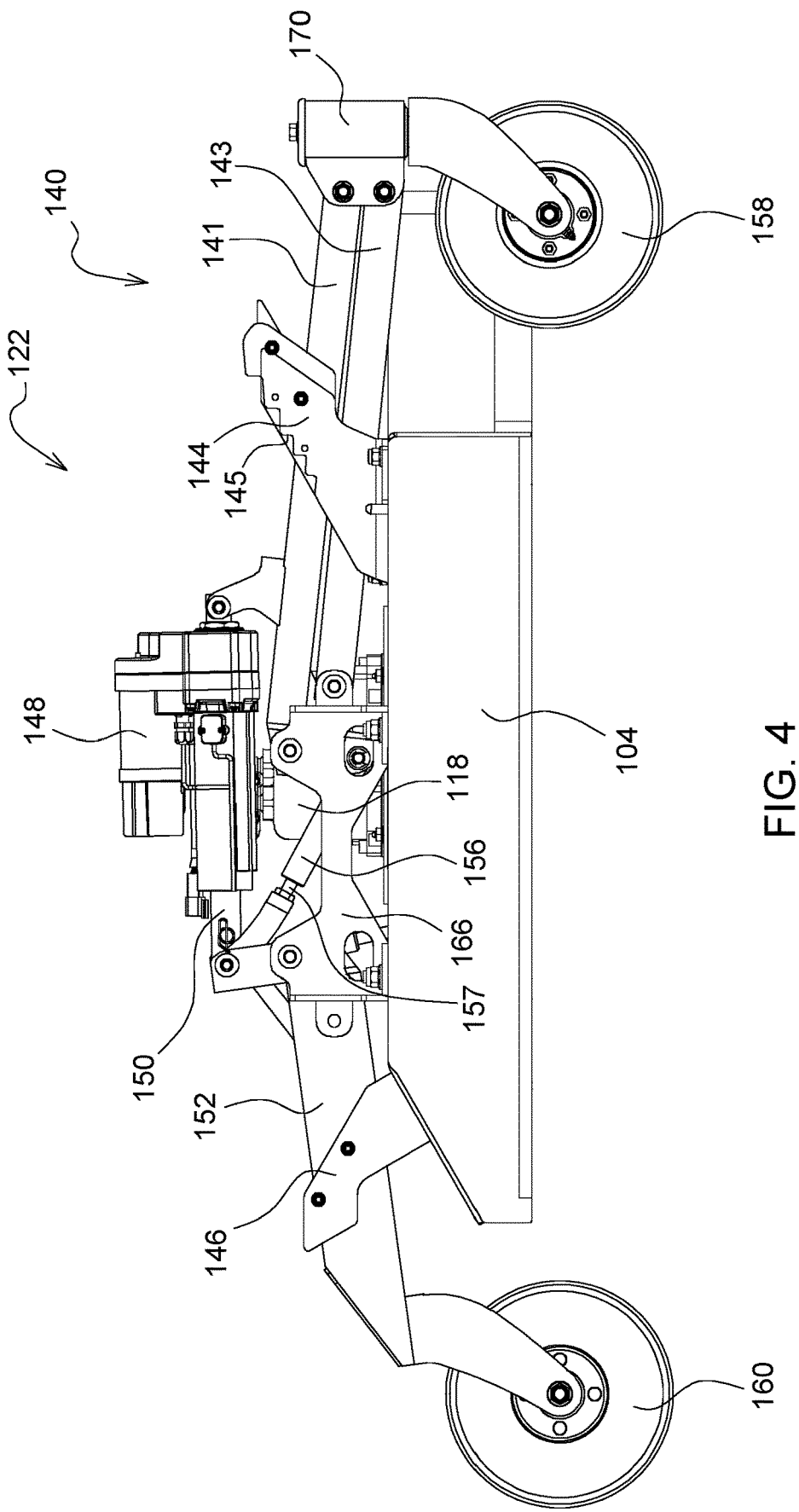
FIG. 4 is a side view of a wing deck of a flexible mower deck with a height of cut adjustment mechanism at a high height of cut setting according to a first embodiment of the invention.
Figure 5:
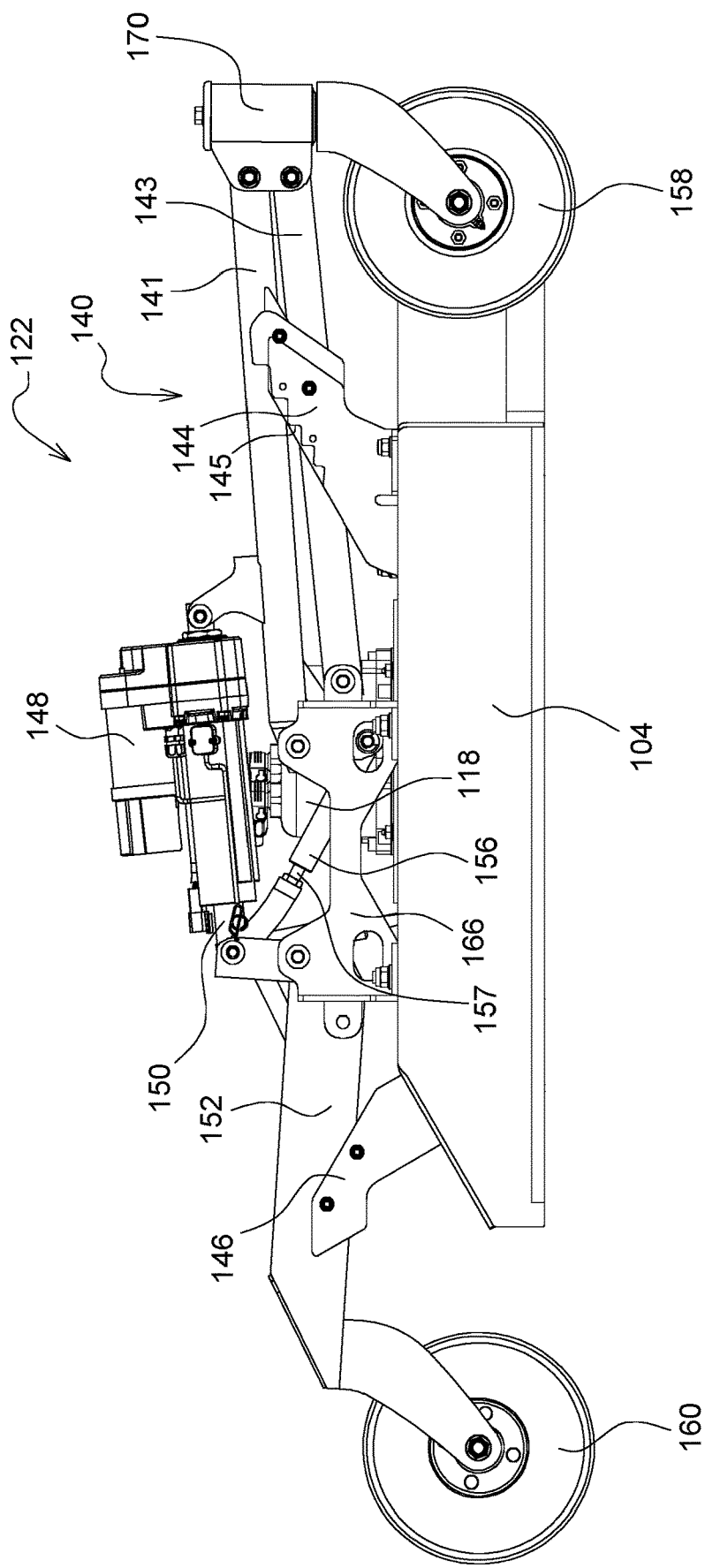
FIG. 5 is a side view of a wing deck of a flexible mower deck with a height of cut adjustment mechanism at a low height of cut setting according to a first embodiment of the invention.

In one embodiment, shown in FIGS. 4 and 5, flexible mower deck 100 may include height of cut adjustment mechanism 122, 124 on each wing deck 104, 106. Each wing deck height of cut adjustment mechanism may be operated independently using a bidirectional variable height of cut switch to extend or retract linear actuator 148. For example, each linear actuator 148 may be electronically actuated using a switch located on control lever or joystick 172, 174. Alternatively, each linear actuator 148 may be hydraulic or manual and may be actuated with a dial or lever in the operator station adjacent display panel 137. When actuated, the linear actuator 148 may be extended to move a wing deck to a high height of cut setting shown in FIG. 4, or retracted to a low height of cut as shown in FIG. 5. Center deck 102 also may be raised using a foot pedal and then lowered to a desired height of cut which the operator may be set with rotatable height of cut control knob 135.

In one embodiment, the height of cut mechanism on each wing deck of flexible mower deck 100 may include four-bar caster wheel level mechanism 140. The four-bar caster wheel level mechanism 140 may support and hold front caster wheel sleeve 170 in vertical alignment at any height of cut. The four-bar caster wheel level mechanism 140 may include a pair of bars 141, 143 extending forward to the front caster wheel sleeve. Each of the pair of bars 141, 143 may pivotably connect front caster wheel sleeve 170 to center bracket 166 on the wing deck.

In one embodiment, the height of cut adjustment mechanism on each wing deck may include rear arm 152 which supports rear trailing wheel 160 behind the wing deck. Rear arm 152 may be L-shaped and pivotably mounted to center bracket 166 on a pivot axis between a forward end which may be connected to the extendable shaft 150 of linear actuator 148, and a rear end which may be connected to rear trailing wheel 160. Rear arm balancer 156 may provide a linkage between rear arm 152 and the four-bar caster wheel level mechanism 140 to ensure that the front caster wheel and rear trailing wheel move together and each wing deck stays at the specified rake angle for any height of cut position. Rake angle refers to any difference in deck height from the front to rear of the deck, and may be set by adjusting the length of rear arm balancer 156 using threaded extender 157.

In one embodiment, as shown in FIGS. 4 and 5, the height of cut mechanism on each wing deck may include front and rear guides 144, 146 mounted to the wing deck surface adjacent the four bar caster wheel level mechanism and the rear arm respectively. The front guide may help support and stabilize the pair of bars in the four-bar caster wheel level mechanism, and the rear guide may help support and stabilize the rear arm, to prevent twisting or bending. Additionally, the front guide also may include a visible height indicator, such as a series of steps or marks 145, showing the wing deck height of cut position.

Having described the preferred embodiments, it will become apparent that various modifications can be made without departing from the scope of the invention as defined in the accompanying claims.

What is claimed is:

1. A flexible mower deck, comprising:
    a center deck with a plurality of rotary cutting blades rotated by a belt engaging a driven pulley for each blade;
    a first wing deck and a second wing deck pivotably attached to a first end and a second end of the center deck, each of the wing decks pivotable between a lowered mowing position and a raised transport position;
    an electric motor mounted on each of the wing decks to rotate a rotary cutting blade under each of the wing decks; and
    a controller configured to 1) monitor a sensed rotational speed of the plurality of rotary cutting blades of the center deck and 2) set a rotational speed for each of the electric motors to match the sensed rotational speed;
    wherein the belt is operable to rotate the plurality of rotary cutting blades of the center deck while each wing deck is in either the mowing position or the transport position.

2. The flexible mower deck of claim 1 further comprising a deck position sensor on each of the wing decks that detects if the wing deck is raised to the transport position.

3. The flexible mower deck of claim 1 further comprising a lift/lower switch on each of a pair of operator controls to pivot each wing deck between the mowing position and the transport position.

4. The flexible mower deck of claim 1 further comprising:
    a first height of cut actuator coupled to the first wing deck by way of a first linkage, the first height of cut actuator and the first linkage configured to raise and lower a height of cut of the first wing deck; and
    a second height of cut actuator coupled to the second wing deck by way of a second linkage, the second height of cut actuator and the second linkage configured to raise and lower a height of cut of the second wing deck.

5. The flexible mower deck of claim 1 further comprising:
    a first rear arm balancer linkage having an adjustable length for setting a first wing deck rake angle; and
    a second rear arm balancer linkage having an adjustable length for setting a second wing deck rake angle.

6. A flexible mower deck, comprising:
a pair of electrical switches in an operator station of a zero turning radius mower to pivot a pair of wing decks between a mowing position and a transport position;
an electric motor on each of the wing decks that rotates a rotary cutting blade if the wing deck is in a mowing position;
a center deck positioned between the pair of wing decks having a plurality of rotary cutting blades that are rotated if the wing decks are in the mowing position or the transport position; and
a controller configured to 1) monitor a sensed rotational speed of the plurality of rotary cutting blades of the center deck and 2) set a rotational speed for each of the electric motors to match the sensed rotational speed.

7. The flexible mower deck of claim 6 wherein the plurality of rotary cutting blades of the center deck are belt driven.

8. The flexible mower deck of claim 6 further comprising a pair of hydraulic cylinders actuated by the pair of electrical switches in the operator station to raise and lower each of the wing decks.

9. The flexible mower deck of claim 6 further wherein the switches are on operator control levers.

10. The flexible mower deck of claim 6 further comprising a height of cut actuator coupled to each of the wing decks by way of a linkage configured to raise and lower a height of cut of each of the wing decks.

11. The flexible mower deck of claim 6 further comprising a rear arm balancer linkage coupled to each of the wing decks and having an adjustable length for setting each wing deck rake angle.

12. A flexible mower deck, comprising:
a center deck having a first end and a second end;
a plurality of belt driven pulleys on the center deck for rotating a plurality of rotary cutting blades under the center deck;
a wing deck pivotably attached to each of the first and second ends;
a motor on each wing deck for rotating a rotary cutting blade by actuating a switch in an operator station to pivot each wing deck to a mowing position; and
a controller configured to 1) monitor a sensed rotational speed of the plurality of rotary cutting blades of the center deck and 2) set a rotational speed for each of the motors to match the sensed rotational speed.

13. The flexible mower deck of claim 12 wherein the motor on each wing deck is electric.

14. The flexible mower deck of claim 12 wherein the motor on each wing deck is hydraulic.

15. The flexible mower deck of claim 12 wherein each wing deck may be independently pivoted to a mowing position using a hydraulic cylinder.

16. The flexible mower deck of claim 12 further comprising a height of cut actuator coupled to each of the wing decks by way of a linkage configured to raise and lower a height of cut of each of the wing decks.

17. The flexible mower deck of claim 12 further comprising a rear arm balancer linkage coupled to each of the wing decks and having an adjustable length for setting each wing deck rake angle.

* * * * *